United States Patent [19]
Brown, Jr.

[11] Patent Number: 5,094,869
[45] Date of Patent: Mar. 10, 1992

[54] METHOD FOR DEGREASING A SUBSTANCE SUCH AS FOOD

[75] Inventor: Hamilton P. Brown, Jr., Hudson, Wis.

[73] Assignee: Zorbit Corporation, Hudson, Wis.

[21] Appl. No.: 347,652

[22] Filed: May 5, 1989

Related U.S. Application Data

[62] Division of Ser. No. 108,753, Oct. 15, 1987, Pat. No. 4,851,273.

[51] Int. Cl.⁵ .............................................. A23L 1/015
[52] U.S. Cl. .................................................. 426/417
[58] Field of Search ............... 426/417; 210/505, 282, 210/484

[56] References Cited

U.S. PATENT DOCUMENTS

| | | | |
|---|---|---|---|
| Re. 31,087 | 11/1982 | Sohl | 210/671 |
| 3,617,566 | 11/1971 | Oshima | 210/484 |
| 3,627,677 | 12/1971 | Dyrud | 210/23 |
| 3,764,527 | 10/1973 | Sohl | 210/30 |
| 3,881,211 | 5/1975 | Rhodes | 426/417 |
| 4,041,203 | 8/1977 | Brock et al. | 428/157 |
| 4,070,287 | 1/1978 | Wiegand et al. | 210/505 |
| 4,097,638 | 6/1978 | Videen | 428/213 |
| 4,104,170 | 8/1978 | Nedza | 210/487 |
| 4,111,813 | 9/1978 | Preus | 210/484 |
| 4,377,615 | 3/1983 | Suzuki et al. | 428/213 |
| 4,423,101 | 12/1983 | Willstead | 428/76 |
| 4,497,712 | 2/1985 | Cowling | 210/282 |
| 4,542,060 | 9/1985 | Yoshida et al. | 428/287 |
| 4,737,394 | 4/1988 | Zafiroglu | 428/102 |
| 4,838,947 | 6/1989 | Levy et al. | 210/282 |

FOREIGN PATENT DOCUMENTS

| | | |
|---|---|---|
| 3608952 | 4/1987 | Fed. Rep. of Germany . |
| 4710361 | 3/1972 | Japan . |
| 2069361 | 8/1981 | United Kingdom . |

OTHER PUBLICATIONS

Nonwoven Textile Fabrics (Spunbonded), pp. 252-273, *Encyclopedia of Textiles, Fibers, and Nonwoven Fabrics*, 1984.

*Primary Examiner*—Donald E. Czaja
*Assistant Examiner*—D. Workman
*Attorney, Agent, or Firm*—Merchant, Gould, Smith, Edell, Welter & Schmidt

[57] ABSTRACT

A method for degreasing a substance such as food is described. The method includes providing in contact with the item to be degreased, an arrangement having a layer for transport of grease from the item to be degreased; and, another layer for ultimate receipt of the grease or oil from the layer in contact with the item. The layer in contact with the item is preferably of a material resistant to collapse or melt at the surface temperature of the item to be degreased. The other layer comprises finer material of higher absorbency, more likely to be damaged by the heat of the items to be degreased. The method concerns transport of the grease through one layer to another layer, in a preferred manner.

9 Claims, 1 Drawing Sheet

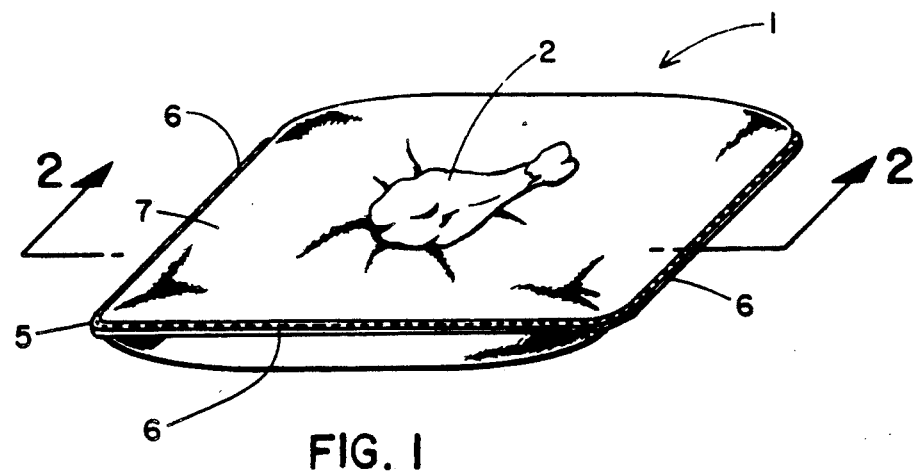
FIG. 1
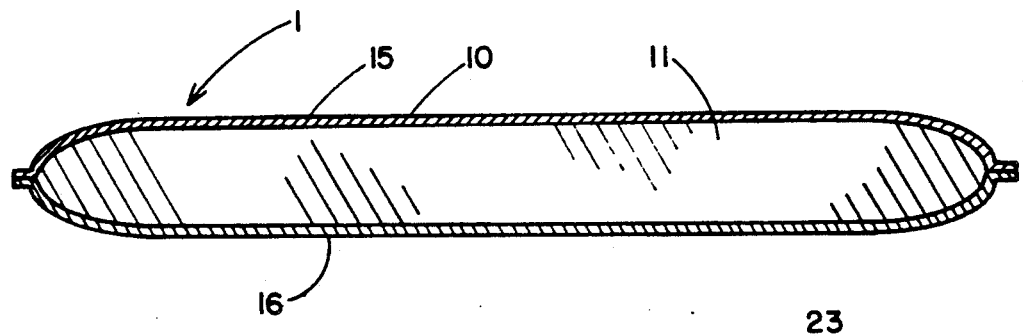
FIG. 2
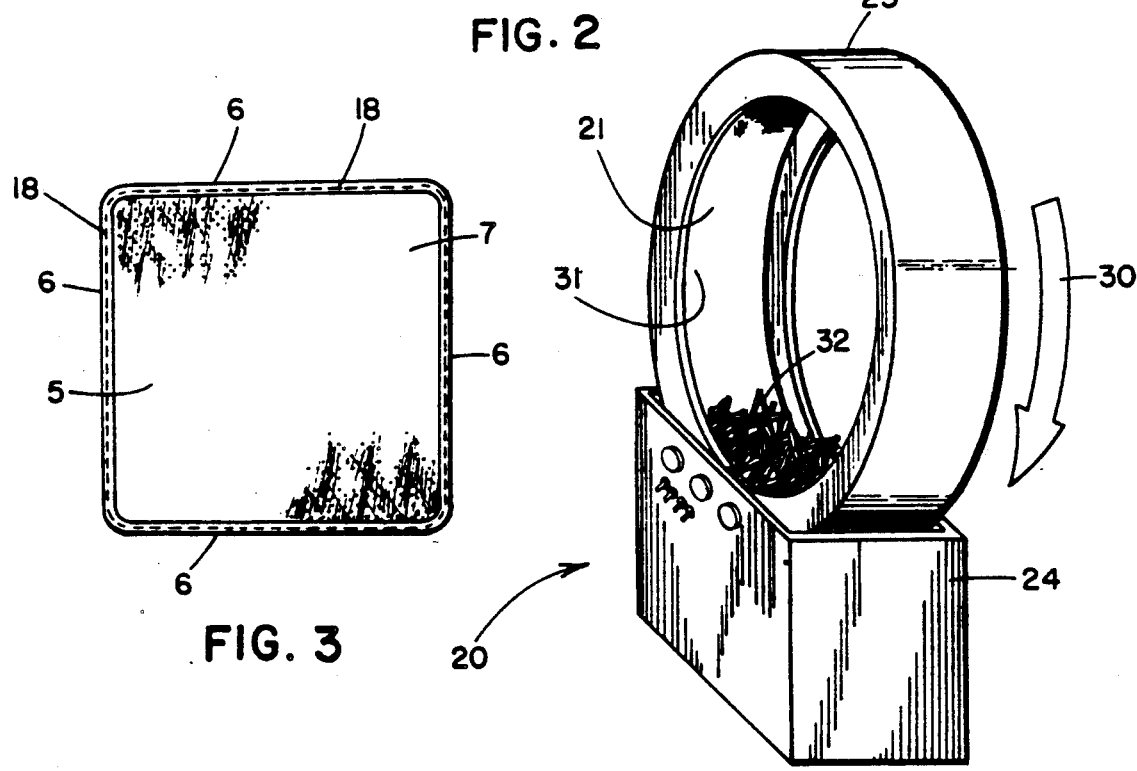
FIG. 3
FIG. 4

METHOD FOR DEGREASING A SUBSTANCE SUCH AS FOOD

This is a division of application Ser. No. 07/108,753, filed Oct. 15, 1987, which issued as U.S. Pat. No. 4,851,273, on July 25, 1989.

FIELD OF THE INVENTION

The present invention relates to the food industry in particular to a method and device for degreasing foods. The invention particularly relates to the provision of an arrangement especially developed to absorb grease from foods set thereon.

BACKGROUND

Many prepared foods, especially fried foods such as french fries, fried chicken, onion rings and the like contain a substantial amount of oil and grease therein; particularly if made as in restaurants by means of conventional deep-frying equipment or the like. This excessive oil or grease may cause the food to have an unpleasant taste and/or texture. Further, the excessive oil or grease maybe associated with undesirable nutritional characteristics. Also, the shelf life of foods prepared in a considerable amount of oil is relatively short, since in time the oil will penetrate into the food, causing a soggy and unpleasant texture.

Typical methods of removing the oil or grease from the foods include conventional draining and blotting. For a conventional draining procedure, typically the food is trapped in a strainer of some type, from which the grease is allowed to drain through gravity action, shaking or the like. An example of this is the typical deep-fry strainer, used in many fast food establishments for the preparation of french fries or chicken.

Another conventional method of degreasing foods is through the use of a conventional blotter or the like, for example an absorbent sheet of cloth or paper. Problems with these are that the materials are often not sufficiently absorbent to readily degrease the material, either as rapidly as desirable or to as great an extent as might be desirable. Further such sheet materials, with oil or grease absorbed on the surface thereof, may become locally saturated, messy and inconvenient to handle.

Some specialized materials have been developed to handle and readily absorb oils and greases. One example of this is T-151 oil sorbent, a 3M product, (Minnesota Mining and Manufacturing, St. Paul, Minnesota 55144). T-151 absorbent and similar absorbent materials are typically non-woven polymeric fiber webs and include certain polyolefin polymers such as polypropylene, polyethylene, poly-4-methylpentene, arylene, styrene, and copolymers thereof (100% polypropylene being the most effective), as well as polyesters, polyamides, and polycarbonates. A web is readily made from these polymers or mixtures or blends of them. The web forms a sorbent layer of material, typically having fibers ranging in diameter from 0.1 to 250 microns. The web density, expressed as a percent of fiber density, for preferred sorbents ranges from about 2 to 65% and generally 4 to 35%. The lower the density of the web, generally the greater its capacity to attract and retain oil. Layers of such polymeric materials useable as a sorbent may also be formed from chopped, spun, fibrulated or otherwise arranged material.

The use of such a material to separate water and immiscible oils and oil-like substances, from mixtures, is described in U.S. Pat. Re. No. 31,087 reissued Nov. 23, 1982, the disclosure of which is incorporated herein by reference. Such a fibrous web is generally capable of absorbing and retaining many times its own weight of oil, and thus can be very efficient as an absorbent material.

Absorbent pads made from such materials, however, are generally unacceptable for use alone as blotting pads in association with fried foods or the like. The reasons for this are generally twofold:

1. First, such absorbent materials are generally formed as non-woven, highly fibrous, webs. The many fibers, and high surface area, facilitate oil collection. However, the tiny fibers can easily become separated from the web, and will often cling to foods placed thereagainst. A similar problem occurs if chopped material is used.

2. Also, such highly fibrous, absorbent, polymeric materials typically have a relatively low melting point and are easily damaged by application of substantial heat. As a result, it is often found that when very hot, oil-soaked, fried foods are placed against the absorbent material, substantial heat damage occurs. This can cause the absorbent material to stick to the food, and it generally reduces the effectiveness and efficiency of absorption. Further, it sometimes may lead to transfer of an undesirable taste to the food materials.

Except for the problems described above, generally the high absorbency of polymeric fibrous materials such as those described makes them an excellent candidate as absorbent material for oil and grease absorption; and, indeed, in many applications these materials have found, and are likely to continue to find, substantial use, especially in relatively low temperature applications (about 200° F. or below). What has been needed, however, has been a method and arrangement for providing such absorbent materials whereby they can be used effectively with relatively hot, oil-soaked, foods or the like.

OBJECTS OF THE INVENTION

Therefore, the objects of the present invention are: to provide an arrangement for use in degreasing fried foods or the like; to provide such an arrangement which utilizes a fibrous polymeric absorbent component or material as a primary sorbent in a manner substantially inhibiting the likelihood of transfer of fibers or pieces of such material onto the food; to provide such an arrangement including means inhibiting likelihood of heat damage of the primary absorbent component; to provide a preferred such arrangement comprising a pad having an outer layer of protective material, and an inner layer of absorbent material; to provide a preferred such arrangement wherein the outer layer comprises an oil permeable material; to provide an oil permeable material for an outer layer of such an arrangement which is relatively insensitive to heat damage, has a relatively low capacity for direct absorbence of oil or grease, and which has a relatively high propensity for the passage of oil or grease therethrough into the inner absorbent materials; to provide a preferred arrangement wherein the outer layer comprises a spunbonded, non-woven, fibrous web; to provide such an arrangement wherein the spunbonded fibrous web comprises a polypropylene web; to provide a preferred arrangement wherein the outer web helps protect the inner sorbent from heat damage; to provide a method of degreasing fried foods or the like;

to provide such a method comprising provision of an arrangement such as previously described; and, to provide an arrangement for degreasing fried foods or the like which is relatively easy to manufacture, simple to use, and which is particularly well adapted for the proposed usage thereof.

Other objects and advantages of this invention will become apparent from the following descriptions, taken in connection with the accompanying drawings, wherein and set forth by illustration and example certain embodiments of the present invention.

SUMMARY OF THE INVENTION

An arrangement is provided for facilitating absorption of grease and oils contained in foods, typically hot fried foods or the like. The preferred embodiment comprises an arrangement having an inner absorbent material, and an outer protective material. The inner sorbent or primary absorbent material preferably comprises a polymeric substance capable of efficiently drawing or absorbing oil and grease from foods or the like. The outer protective layer generally comprises material relatively insensitive to problem heat damage, with respect to the inner sorbent, and having the characteristic of generally retaining the absorbent material and especially fibers or particles thereof within the arrangement, while at the same time permitting relatively free passage of oil or grease into the absorbent material. Further, for the preferred embodiment, the outer layer of material possesses appropriate heat sink characteristics, to inhibit transfer of substantial heat from hot foods into the inner absorbent material. By this latter feature, the outer layer generally protects the inner absorbent material from melting.

A variety of materials, including conventional ones, may be utilized as the inner absorbent material. The invention, however, is particularly well adapted for the use of a fibrous polypropylene inner absorbent material, such as type T-151 absorbent produced by 3M Company, St. Paul, Minnesota.

The outer layer may be a variety of oil permeable materials, preferably having a high affinity and a relatively low capacity for the absorption of oil or grease. By "high affinity" it is meant that the material surface is readily wetted by, or attracts, oils or greases. By "low capacity" it is meant that the outer layer preferably has a lower capability for retaining oil or greases, per unit weight, than does the inner absorbent material. It will be understood that while such features of relatively high affinity and relatively low capacity may be preferred, advantages according to the invention may be obtained from alternate arrangements. Sufficient permeability is required, to permit the oil or grease to readily pass therethrough and into the inner absorbent material. A relative insensitivity to heat damage generally inhibits destruction of outer portions of the arrangement, thus facilitating retention of the structural integrity of the arrangement and protecting the food from melted material or fibers. Preferably, the outer material is such that, at least with respect to oils or greases found in typical foods, local saturation is unlikely and is avoided, and relatively speedy transfer of oil or grease into the highly absorbent inner material is facilitated.

In a preferred embodiment of the present invention, absorbent material is wrapped within an envelope of the outer protective material. In this manner, a pad is formed, on which food materials can be set for draining. In one embodiment, an arrangement of absorbent material is used as a liner for a rotating drum, so that food can be tumbled while the oil and grease is extracted therefrom, facilitating an overall de-oiling or de-greasing procedure.

The drawings constitute a part of this specification and include exemplary embodiments of the present invention, while illustrating various objects and features thereof. It will be understood that in some instances relative material thicknesses, and relative component sizes, may be shown exaggerated, to facilitate an understanding of the invention.

BRIEF DESCRIPTION OF THE DRAWINGS

FIG. 1 is a perspective view of an arrangement according to the present invention, shown having a piece of food material thereon.

FIG. 2 is a cross-sectional view taken generally along the line 2—2, FIG. 1.

FIG. 3 is a top plan view of the arrangement shown in FIG. 1.

FIG. 4 is a partially schematic perspective view of a tumbler device having an arrangement according to the present invention lining an inside thereof.

DETAILED DESCRIPTION OF THE PREFERRED EMBODIMENTS

As required, detailed embodiments of the present invention are disclosed herein. It is to be understood, however, that the disclosed embodiments are merely exemplary of the invention, which may be embodied in various forms. Therefore, specific structural and function details disclosed herein are not to be interpreted as limiting, but rather as a basis for the claims and as a representative basis for teaching one skilled in the art to variously employ the present invention in virtually any appropriately detailed manner.

Before detailed information concerning the absorbent material and outer layer are presented, a general description of physical embodiments of the present invention is provided, as follows:

The reference numeral 1, FIG. 1, generally designates an arrangement according to the present invention. The arrangement 1, FIG. 1, is depicted having a piece of food 2 thereon. The perspective view is intended to represent a typical operation of the arrangement 1 to remove hot oil, grease or the like from a hot piece of food 2, such as fried chicken.

The pad arrangement 1, FIG. 1, may be of a variety of shapes, sizes, thicknesses, weights, etc. The particular arrangement 1 shown, comprises a somewhat pillow-shaped pad 5, generally rectangular in configuration and having outer edges 6, defining an outer periphery 7.

The internal construction of pad arrangement 1 may be understood by reference FIG. 2. Generally, the arrangement 1 comprises an outer sheath or case 10 formed of a preferred material, which surrounds an inner, highly absorbent, material 11. The sorbent material 11, described in detail below, generally possesses appropriate physical and chemical characteristics relating to a high capacity for oils or greases used in food preparation or processing. The outer sheath or case 10, described below in detail, generally comprises a.material sufficiently permeable to permit the ready passage of greases and oils therethrough and also preferably is of an appropriate density to inhibit passage of fibers or pieces of the absorbent material outwardly therefrom. Also, preferably the outer case 10 is formed of a material relatively insensitive to heat damage, so that it will not be adversely affected by the presence of hot oily foods thereon and so that the food will not be adversely affected. For example, if a fibrous material is used for case 10, relatively large fibers may be selected. Such "large" fibers will be more able to withstand close association with hot food, than can small fibers or pieces of material 11. That is, large fibers are harder to substantially destroy upon contact with a hot piece of food, than are small fibers.

Preferably the nature of the material 10 is such that sufficient heat transfer and cooling takes place, with respect to oil or grease passing therethrough to inhibit substantial melting or heat damage of the internal absorbent material 11. That is, sufficient cooling occurs to prevent substantial heat flow into the internal absorbent 11. It will be understood, from the following detailed descriptions of the absorbent material 11, that often preferred absorbent materials have fine fibers of relatively low melting point, and are fairly easily damaged from heat at or below typical temperatures of hot, greasy or oily, foods.

Referring to FIGS. 1 and 2, outer case 10 includes an upper layer 15 and a lower layer 16, having absorbent material 11 trapped therebetween. For the embodiment depicted, the upper and lower layers 15 and 16 each comprise a rectangularly shaped piece of outer case material, the two layers 15 and 16 being sealed against or attached to one another along the outer periphery 7. For the embodiment depicted in FIGS. 1, 2 and 3, upper layer 15 is attached to lower layer 16 by means of stitching 18, in the outer peripheral area 7. It will be understood, however, that a variety of methods and techniques may be utilized for the physical sealing of the arrangement 5, with the resilient material 11 trapped therein. For example, adhesives may be used, as well as heat-sealing, sonic welding and similar methods. It will also be understood that in some instances a substantially continuous envelope may be formed, having one or more sides open, for the insertion of sorbent material 11 therein. For example, the outer case 10 might comprise a single large sheet of material, folded over with the sorbent material 11 trapped inside. For such an arrangement stitch sealing or the like may not be necessary along one or more sides of the embodiment. In yet another embodiment, the pad may be one-sided, with the protective layer, for example, simply being mounted on top of a layer of absorbent material. The thickness of the pad is a variable, dependent upon likely use, cost, etc. Further, the relative thicknesses of the various layers may be changed considerably, from embodiment to embodiment.

In a typical use for degreasing foods according to the present invention, the arrangement 1 is placed underneath food to be treated, as indicated in FIG. 1. In the alternative, or in addition, a pad of material may be placed over the food to be treated. For some uses, an elongated blanket of material can be prepared, which may be folded over or around the food. The thickness of the arrangement preferred for a use will generally be a function of the intended use and the amount of sorbent 11 it is desired to have in the immediate vicinity of the food. For example, a relatively thick arrangement may be desired if multiple uses before saturation are desired.

An advantageous embodiment of the invention is illustrated in FIG. 4. FIG. 4 is a perspective, partial schematic, view of an assembly 20 incorporating a pad arrangement 21, according to the present invention. The apparatus 20 comprises a cylindrical drum or basket 23 mounted in a system, not detailed, for rotation; rotation being controlled by a control mechanism 24. For the apparatus 20 shown, mechanism 24 operates to selectively rotate the cylindrical drum 23 in the general direction indicated by arrow 30. The pad 21, formed generally as described above with an inner absorbent layer and an outer protective layer, is arranged as a liner along inside 31 of the cylindrical wall 23. Food material 32, such as french fries or the like, is placed inside of the tumbling or rolling drum 23, and on the outer layer of the pad 21. The rotation action, and tumbling of the food 32, brings substantially all portions of the food into contact with the pad 21, for degreasing. If desired, assembly 20 may be provided with a heater, to keep the food hot as it is tumbling and being degreased.

From the above examples it will be readily understood that degreasing arrangements, i.e. pad arrangements according to the present invention, may be provided in a variety of shapes and sizes, and for use in association with a variety of support structures. The principal advantages of arrangements according to the present invention are derived from the nature of the two primary components of the arrangement, the internal sorbent and the external protective layer. These materials are, generally, as described below in detail:

The Internal Absorbent Material (or Sorbent)

The material operationally positioned inside of the pad arrangement, to provide for absorbence and retention of oil or grease, may be of any of a variety of conventional materials, or materials yet to be developed. One such material is sold under the trade designation T-151, by 3M Corporation, St. Paul, Minnesota. This material is a non-woven, fibrous, polypropylene product capable of absorbing between 5 and 50 times its own weight, of oil or grease, and substantially retaining the same.

The general preferred characteristics of the sorbent component is that it should be a substantially absorbent material in terms of weight of oil absorbed per weight of absorbent material. Generally, a rather small fiber diameter is preferred, as it increases surface area for contact with oil. The overall density and porosity are generally important for such compounds, as they relate to transport of oil to inner fibers, and absorbence thereat. The inner material may take a variety of forms including a fabric or web form, a chopped form, or a fine particulate form.

Preferred absorbent materials comprise synthetic non-woven polymeric fibers and include polyolefinic polymers, or co-polymers and blends, of such materials as polypropylene, polyethylene, poly-4-methylpenteneylene, polystyrene and polystyrene. Also arrangements including polyesters, polyamides, and polycarbonates may be used. Preferred materials made from these fibers, which form the sorbent component, generally include fibers ranging in diameter from 0.1 to 250 microns. The material density, expressed as a percent of fiber density, preferably can range from about 2 to 65% and more preferably from 4 to 35%. Generally, the lower the density of the web the greater its capacity to attract and retain oil. Preferred materials used in association with the present invention generally have a thickness of about 0.006 to 1.0 inches and an overall weight of about 6 to 12 ounces per square yard.

The molecular weight of the sorbent component can be less than the original molecular weight of the polymer used to create the fiber, due to the manufacturing process. This change in molecular weight generally contributes to a lowering of the melting temperature of the sorbent material. As a result, this type of absorbent material has a substantial risk of melting at use temperatures, if brought into direct contact with hot food having a hot grease or oil therein. The general nature of absorbent materials which may be utilized in association with the present invention, are readily understood from the above. Typical physical properties of a preferred absorbent material are as follows:

| Physical Property | Preferred Range |
| --- | --- |
| Basis weight | 5 to 1000 gms/m$^2$ |
| Tensile strength | 0.1 to 6.0 lb/in |
| Resistance to air flow @ 32 lpm | 0.1 to 500 mm H$_2$O |
| Oil sorbency | 1 to 50 times its weight (gm oil/gm sorbent) |
| Web density | 0.032 to 0.52 gm/cc |
| Fiber diameter | 0.1 to 250 microns |

A general characteristic of webs of such materials is that they include many relatively loosely packed fibers which can readily become disassociated and which can adhere to food or the like, when the pad is brought into direct contact therewith. Further, again, such compounds characteristically are easily damaged from heat transfer from the relatively hot foods, having substantial amounts of oil or grease therein. The damage, to a great extent, results from the very small particle or fiber size.

An advantage to such materials, however, is that they have such a high affinity and capacity for oil or grease due to their construction from many very small fibers. This capability not only leads to improvement of food texture, but it also reduces unhealthy contaminants introduced in preparation and enhances taste.

The Outer, Protective Layer

Preferred characteristics of the outer, protective layer include:

1. That it be sufficiently oil permeable to permit ready passage of oil or grease therethrough, into the substantially absorbent layer on the inside of the pad arrangement;

2. That it be of appropriate design to substantially prevent loss or transfer of fibers of the inner sorbent material outwardly therethrough;

3. That it not possess substantial capacity to absorb grease or oil itself, (relative to the inner material) which might create a potentially saturated local surface area of the pad arrangement; but that it does possess sufficient affinity for oil or grease, to be readily wetted thereby;

4. That it preferably possess sufficient heat transfer or heat sink characteristics, to inhibit transfer of sufficient heat through to the inner sorbent material to cause substantial melting thereof; and, 5. That it be relatively stable to heat from contact with hot greasy foods or the like.

A variety of materials may be utilized to achieve the above desired characteristics. A wide range of specific physical characteristics in those materials may be tolerated. Generally, those physical properties providing for the above requirements relate to or concern:

1. Melting point and molecular weight;

2. Thermal conductivity, i.e. if thermal conductivity is high, actual melting point can be relatively low. If polymeric, the glass transition temperature can be below the temperature of the treated article. The protective layer could be coated with a material having high thermal conductivity.

3 That the protective layer should be such that it does not transfer any substantial contamination of its own to the treated article.

4. That the protective layer should act as a barrier to prevent transfer of contaminating material from the inner sorbent material to the treated article, i.e. it should act as a filter.

5. That the protective material should have sufficient strength to provide overall product or pad integrity. Also sufficient abrasion resistance should be provided so that there is minimal release of fibers or particulate matter.

6. That the material should be oleophillic itself, so that the oil does not have to cross energetically unfavorable air or surface tension boundaries, i.e. jump a gap as it wicks through the outer layer into the inner sorbent. Generally, the material should act as a conduit for oil between the treated article and the inner sorbent component. Oil capacity of the protective layer is not necessarily critical, but again the protective layer should act as a wick.

7. Preferably the material is relatively oil permeable.

8. Intimate contact between the protective layer and the treated article is important. The rapid rate of oil removal and the resultant improved taste is facilitated by a multiplicity of contact points over a large area of the food material.

The following materials are representative of some of those materials which may be utilized as the outer layer: almost any porous cellulosic material; metal or fiberglass screens; and films with high diffusion rates. The above listed materials, however, are not generally preferred for numerous reasons. For example, cellulosic materials are generally not very durable or tear resistant. Many metal or fiberglass screens are not of a nature so as to be readily and sufficiently wetted by oil. Further, providing a sufficient mesh from such materials would likely necessitate a relatively expensive cover material.

A preferred outer layer of material is a polypropylene material. However, the polypropylene material used for the preferred outer protective layer should be formed substantially differently from the preferred sorbent material used for the internal portion, so that the drawbacks discussed previously do not result. Preferably, a web process is used and as a result of the different processes of formation, the outer layer has larger fibers with less surface area. Also, the outer protective layer: does not possess substantial oil capacity compared to the inner sorbent; it has relatively long fibers, not easily separated from the web and not likely to cling to the food; and, it is highly porous and permeable. Methods of manufacturing of non-woven web arrangements having appropriate characteristics are well-known.

Preferably, the overall thickness of the outer layer is between about 0.001 and 0.100 inches, and more preferably about 0.005–0.015 inches, and the material has a tensile strength of 0.5 to 15 lbs/inch. This will facilitate structural integrity.

Spun-bonded web materials are particularly well adapted for use according to the present invention. One example of these is a material available under the trade name Celestra from Crown Zellerbach of Camas, Washington. The Celestra material is available in various weights. Woven Celestra material having a weight of about 1 oz/yd$^2$ is particularly suitable and preferred for applications according to the present invention. Such a material, comprising a spun-bonded polypropylene substance, has an approximate thickness of about 0.008 inches, a grab tensile of 25 pounds; elongation 35 to 50%; and elmendorf tear of 475 grams.

Another useable non-woven material is sold under the trade name Softlin as brand number 6724 by Scott Non-wovens of Scott Paper Co.; Philadelphia, Pa. 19113. The material is 100% polypropylene and has an approximate weight of 28 grams/yd$^2$, a thickness of about 0.010 inches; a strip breaking strength of about 500 gm/in, (cross machine direction) and 2500 g/inch (machine direction) and, a grab breaking load of 4 lbs/inch (cross machine direction) and 10 lbs/inch (machine direction).

Application of the present invention will be understood from the following experimental data.

Experiment 1

Test absorbent pads were made as follows:

The outer material selected was 1 oz./sq. yd. Celestra (Crown Zellerbach), and the inner absorbent was 3M Oil Sorbent T-151. Various sized pads were made, ranging from 6"×6" to 18"×18". Generally, each pad was about ¼ inch thick. Stitching along the periphery was accomplished using common sewing thread.

A laboratory heat source was used in conjunction with a Robert Shaw temperature controller and a recorder to provide a stable oil temperature. The oil used was a hydrogenated, yet liquid, vegetable frying oil (brand name Mel Fry, Durkee Famous Foods, SCM Corp., Cleveland, Ohio. A standard "fast food" procedure was used for all trials. Raw potato (not frozen) french fries, approximately ¼×¼×2–4 inches, were fried in a basket dipped in hot oil for 135 seconds, with a basket shake to stir the french fries at 30 seconds. After cooking and removal from the oil, each sample was shaken 3 times (6" vertically) to remove gross excess oil. The french fries were then dumped onto a surface which was either stainless steel (control) or a test sorbent pad made as described above. Two procedures were used for each surface. For a "no shake" procedure, fries were simply dumped onto the surface (steel or pad) and were allowed to sit for 60 seconds prior to weighing. For a "shake" procedure, the fries were dumped onto the surface and shaken 10 seconds, and were then allowed to sit an additional 50 seconds before weighing.

The change in oil retention was determined by weight difference of the test material or stainless steel before and after contact with the french fries. The percent increase in oil loss was calculated by comparing losses with the test material to losses onto the stainless steel, without shaking.

Observations of flavor and texture were made after the weighing.

Results

The percent increase in oil removal from 3 oz portions of the french fries which is attributable to the test pad by comparison to stainless steel, with and without shaking, is presented in Table 1 below.

TABLE 1

|  | With Shaking | No Shaking |
|---|---|---|
| Number of trials | 4 | 4 |
| Mean | 271% | 179% |
| High | 368% | 216% |
| Low | 184% | 136% |

TABLE 1-continued

|  | With Shaking | No Shaking |
|---|---|---|
| Std. Dev. | 95 | 33 |

The data indicates that the sorbent material removed substantially more oil from the french fries then did the stainless steel plate. The increase in oil removed from the french fries due to contact with the pad is significant. Interestingly, there were no increases in oil losses associated with the shake method, when used with a steel plate. This provides evidence that the three vertical shakes remove most of the easily freed oil and in order to reduce oil retention further the oil must be actively transported or drawn from the foods. This also provides strong evidence of an active transport being associated with use of the sorbent pads. No visible melting of the arrangement, or fiber transfer from the test material to the french fries, was observed.

The increase in oil loss due to contact with the test material was about 179%, when compared to the steel plate control without shaking. This amount of oil removal is surprising, considering that the food may only touch the material on one or two sides. When the fries were shaken on the material, i.e. provided with better overall surface contact, oil removal was increased to 271%. Generally, treated fries appeared dry, were crispier, and tasted better and not as oily as fries not brought into contact with the test material. The substantial and relatively fast oil removal is desirable, since less penetration of oil into the french fries will occur. The result is a crispier food product of better appearance and longer shelf life.

It will be understood that a variety of materials may be selected for construction of a pad arrangement according to the present invention. The above described materials are preferred as they function well, and are inexpensive enough to permit economic manufacture of a disposable pad. Thus, cleaning and reuse of pads is of minimal concern, although it may be desired in some instances. Also, the pads retained their integrity, did not show substantial heat damage, and fine fibers of absorbent material were not found on the food.

It is to be understood that certain embodiments of the present invention have been illustrated as described, the invention is not to be limited to specific forms and arrangement of parts herein described as shown.

What is claimed and desired to be secured by Letters as Patent:

1. A method of degreasing food material having a first surface temperature; said method comprising steps of:
   (a) providing an arrangement having:
      (i) a first layer of absorbent material suitable for absorbing and retaining oil and grease drawn from material placed in association with said arrangement; said first layer of absorbent material comprising a non-woven web of loosely bound absorbent fibers having a propensity of melt and collapse under direct contact with food material having a surface temperature of said first temperature; and,
      (ii) a second layer of highly permeable protective material operationally positioned in a covering and abutting relationship with respect to said first layer of absorbent material; said second layer of material being resistant to melt and collapse under direct exposure to the first temperature; said second layer having substantial wicking characteristics for draining and transport of oil and grease; said second layer of absorbent material having a lesser capacity for oil and grease than said first layer of absorbent material;

(b) placing a portion of food material having said first surface temperature on said second layer of absorbent material; and, (c) transporting grease from the food material directly into said second layer of absorbent material and then from said second layer of absorbent material to said first layer of absorbent material with sufficient cooling of the grease in the second layer of absorbent material to substantially inhibit melt and collapse of the absorbent fibers of said first layer of material.

2. A method according to claim 1 wherein:

(a) said first layer of absorbent material comprises a non-woven web of relatively loosely bound and highly absorbent fibers.

3. A method according to claim 1 including providing as said first layer of absorbent material a web of absorbent material comprising absorbent fibers selected from the group consisting of: polypropylene; polyethylene; poly-n-methylpentene; polyarylene; polystyrene; polyesters; polyamides; polycarbonates; and, combinations thereof.

4. A method according to claim 3 including providing said first layer of absorbent material from a web of fibers wherein each fiber has a diameter of between about 0.1 and 250 microns.

5. The method according to claim 1 wherein said first layer comprises polypropylene.

6. A method according to claim 1 including:

(a) providing as the second layer of absorbent material a non-woven spun-bonded polypropylene web.

7. A method according to claim 1 including steps of:

(a) providing said second layer of absorbent material in an envelope arrangement with said fist layer of absorbent material enclosed therein; and, (b) placing the food material on top of the envelope arrangement.

8. A method according to claim 6 including a step of providing as said first layer of absorbent material a polypropylene material.

9. A method of degreasing a substance having a first surface temperature; said method comprising:

(a) a first step of transferring grease from the substance directly into a covering layer of highly permeable protective material resistant to melt and collapse under direct exposure to the first temperature; the layer of highly permeable material having: substantial wicking characteristics for draining and transport of oil and grease; and, a first capacity, per unit weight, for absorbent and retention of oil and grease;

(b) a second step of transferring grease from the covering layer of protective material into a layer of absorbent material having: a greater capacity, per unit weight, for oil and grease than the covering layer; and, a propensity to melt and collapse under direct contact with a substance having the first surface temperature; and, (c) during said first and second steps of transferring grease, maintaining the covering layer between the substance to be degreased and the layer of absorbent material having a greater capacity for oil and grease retention than the covering layer of protective material.

* * * * *